(12) United States Patent
Wagner et al.

(10) Patent No.: US 10,695,933 B2
(45) Date of Patent: Jun. 30, 2020

(54) METHOD FOR CUTTING MATERIAL TO BE CUT

(71) Applicant: SCHUNK SONOSYSTEMS GMBH, Wettenberg (DE)

(72) Inventors: Peter Wagner, Wettenberg (DE); Manuel Fey, Mittenaar (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 104 days.

(21) Appl. No.: 15/770,625

(22) PCT Filed: Oct. 31, 2016

(86) PCT No.: PCT/EP2016/076231
§ 371 (c)(1),
(2) Date: Apr. 24, 2018

(87) PCT Pub. No.: WO2017/080862
PCT Pub. Date: May 18, 2017

(65) Prior Publication Data
US 2019/0054645 A1    Feb. 21, 2019

(30) Foreign Application Priority Data

Nov. 9, 2015   (DE) .......................... 10 2015 222 011

(51) Int. Cl.
*B23K 20/10* (2006.01)
*B26D 7/08* (2006.01)
*H01R 43/02* (2006.01)
(Continued)

(52) U.S. Cl.
CPC ............ *B26D 7/086* (2013.01); *B23K 20/004* (2013.01); *B23K 20/10* (2013.01); *B23K 37/04* (2013.01);
(Continued)

(58) Field of Classification Search
CPC .............................. B26D 7/086; B23K 37/04; B23K 20/10–106; B23K 2101/38; B23K 1/06;
(Continued)

(56) References Cited

U.S. PATENT DOCUMENTS 5,906,694 A * 5/1999 Duly ..................... B23K 20/12
156/251
2002/0092398 A1 * 7/2002 Kawano ................ B23D 15/08
83/636
(Continued)

FOREIGN PATENT DOCUMENTS

CN    102548735 A    7/2012
CN    104955604 A    9/2015
(Continued)

OTHER PUBLICATIONS

Schunk Ultrasonic Welding Systems MINIC-II, Schunk Sonosystems, Feb. 1, 2001, http://www.komtech.co.za/wp-content/uploads/pdfdownload/ultrasonicwelding/MINIC-11_E.pdf.

*Primary Examiner* — Kiley S Stoner
(74) *Attorney, Agent, or Firm* — King & Schickli, PLLC (57) ABSTRACT

The invention relates to a method for cutting material to be cut, which is preferably realized as a rod-shaped element, comprising a receiving device for fixedly receiving the material to be cut in such a manner that a part to be separated from the material to be cut protrudes over an element edge of the receiving device realized as a counter knife edge (42), and comprising a knife unit having a knife (24), which is movable with respect to the receiving device and which moves a knife edge (25) past the counter knife edge (42) in a cutting movement for executing a separating cut, the welding material being subjected to ultrasound for executing oscillations during the cutting movement.

16 Claims, 7 Drawing Sheets

(51) Int. Cl.
*B23K 20/00* (2006.01)
*B23K 37/04* (2006.01)
*B23K 101/38* (2006.01)

(52) U.S. Cl.
CPC ...... *H01R 43/0207* (2013.01); *B23K 2101/38* (2018.08)

(58) Field of Classification Search
CPC .............. B23K 20/004; B23K 2101/32; H01R 43/0207
USPC ...................... 228/110.1, 1.1, 4.5, 180.5, 904
See application file for complete search history.

(56) References Cited

U.S. PATENT DOCUMENTS

| | | | |
|---|---|---|---|
| 2003/0192414 A1* | 10/2003 | Farassat | B23K 20/004 83/694 |
| 2004/0088857 A1* | 5/2004 | Fujimoto | H01R 11/12 29/871 |
| 2004/0134327 A1* | 7/2004 | Capodieci | A21C 11/10 83/13 |
| 2006/0278682 A1* | 12/2006 | Lange | B23K 20/004 228/4.5 |
| 2007/0196540 A1* | 8/2007 | Kirksey | A21C 9/04 426/94 |
| 2007/0257088 A1* | 11/2007 | Steiner | B23K 20/004 228/110.1 |
| 2009/0127316 A1* | 5/2009 | Siepe | B23K 20/004 228/110.1 |
| 2018/0125090 A1* | 5/2018 | Skoglund | A23G 9/26 |

FOREIGN PATENT DOCUMENTS

| | | | | |
|---|---|---|---|---|
| CN | 104959733 A | | 10/2015 | |
| DE | 102004022313 B3 | | 10/2005 | |
| DE | 102005004771 A1 | * | 8/2006 | .......... B23K 20/106 |
| DE | 2006020429 | | 10/2007 | |
| WO | WO2015067700 A1 | | 5/2015 | |
| WO | WO 2015/107484 A1 | * | 7/2015 | |

* cited by examiner

METHOD FOR CUTTING MATERIAL TO BE CUT

FIELD OF THE INVENTION

The invention relates to a method for cutting material to be cut, which is preferably realized as a rod-shaped element, comprising a receiving device for fixedly receiving the material to be cut in such a manner that a part to be separated from the material to be cut protrudes over an element edge of the receiving device realized as a counter knife edge, and comprising a knife unit having a knife, which is movable with respect to the receiving device and which moves a knife edge past the counter knife edge in a cutting movement for executing a separating cut.

BACKGROUND OF THE INVENTION

From the product brochure "Schunk Ultraschall-Schweiß-systeme MINIC-II" [English: "Schunk Ultrasonic Welding Systems MINIC-II"] by Schunk Sonosystems GmbH dated February 2011, a method for cutting rod-shaped conductors is known which is used in combination with an ultrasonic welding unit comprising a receiving device realized as a compacting space for receiving blank portions of rod-shaped conductors which are to be connected to form a weld node, a sonotrode, which delimits the compacting space and which serves for forming the weld node, being used for subjecting the blank portions to ultrasound. The knife unit comprises a knife which can be moved past a counter knife edge of the compacting space in a cutting movement in such a manner that a part to be separated from the blank portions connected to each other to form a cutting node, which protrudes over the counter knife edge of the compacting space, is separated.

SUMMARY OF THE INVENTION

In the known method, the knife unit is used as a so-called reject part cutter and is supposed to separate the conductors connected to one another via the weld node after detecting a faultily conducted weld node in order to preclude further processing electric conductors faultily connected to one another by destructing the weld node.

For this purpose, the device for conducting the method is realized such that the process parameters or the geometry of the weld node produced in the compacting space as well are examined in situ while producing the weld node in the compacting space and that the knife unit is automatically activated upon detecting faults, such as exceeded threshold values. In the known method, the subjection to ultrasound of the blank portions of the conductors to be connected to one another to form a weld node is terminated before executing the subsequent cutting process so that the conductors are therefore not subjected to ultrasound during the cutting process.

In order to actuate the knife unit, a drive unit is provided by means of which a cutting movement and a return movement of the knife of the knife unit is carried out. The drive unit must generate the drive force required for executing the cutting process by means of a drive motor and must transfer the drive force to the knife for generating the cutting force by means of a gear unit dimensioned sufficiently for transferring the drive force. As it is quite common for the conductors to comprise conductor cross sections of up to 30 mm$^2$, accordingly high cutting forces are required which demand a corresponding dimensioning of the drive motor and the gear unit.

It is the object of the invention at hand to propose a method which enables cutting material to be cut, which is preferably realized as a rod-shaped element, using as little cutting force as possible in order to enable an accordingly small dimensioning of the drive motor and the gear unit.

In order to attain this object, the method according to the invention comprises the features of claim 1.

According to the invention, the weld material is subjected to ultrasound for executing oscillations during the cutting movement.

In trials, it has proven that subjecting the material to be cut to ultrasound during the cutting movement leads to the cutting force required for executing the cutting process to be significantly reduced. This is a general discovery so that the advantageous effect of the reduction in cutting force as a result of the material to be cut being subjected to ultrasound during the cutting movement turns out to be generally independent of the particular type of application, meaning the reception device does not have to be realized as a compacting space of an ultrasonic welding unit as in the state of the art referenced above but merely has to enable a fixed reception of the material to be cut under formation of a counter knife edge by an element edge of the receiving device in general. In combination with the knife edge, the counter knife edge forms a cutting unit suitable executing the cutting process.

It is possible to subject the material to be cut to ultrasound in a particularly defined manner if, according to a preferred exemplary embodiment, the material to be cut is subjected to ultrasound indirectly via a subjection of the receiving device to ultrasound.

It is particularly preferred if the subjection to ultrasound is conducted transversely, preferably at an angle of 90°, to the direction of the cutting movement so that an alternating relative movement of the reception knife edge occurs in the direction towards the knife edge and away from the knife edge as a function of the frequency of the subjection to ultrasound or rather of the oscillations induced by the subjection to ultrasound and oriented transversely to the cutting movement. As a consequence, temporary reaction forces are repeatedly formed between the material to be cut and the knife edge in conjunction with the frequency of the ultrasonic oscillations.

Using the method for cutting rod-shaped elements has proven to be particularly advantageous, if said rod-shaped elements are realized as fiber bundles or wire bundles, as is the case in particular in electric conductors realized as braids.

The method according to the invention has proven to be particularly advantageous if the receiving device is realized as a compacting space for receiving blank portions of rod-shaped conductors to be connected to one another to form a weld node, comprising a sonotrode for delimiting the compacting space and for subjecting the blank portions to ultrasound, said weld node being subjected to ultrasound by means of the sonotrode subsequent to the formation of the weld node while executing the cutting movement of the knife.

In a manner hitherto unknown, the sonotrode used in an ultrasonic welding unit thus is used not only for producing the weld node between two rod-shaped conductors, which are to be connected to one another, in a compacting area of the ultrasonic welding unit but also for subjecting the weld node to ultrasound during the action of a reject part cutter.

If in this context the subjection to ultrasound by means of the sonotrode occurs during the cutting movement and a return movement of the knife, the subjection to ultrasound can be used not only for reducing the cutting force during the cutting movement but also for reducing the drive force required for the return movement of the knife.

BRIEF DESCRIPTION OF THE DRAWING FIGURES

In the following, a preferred embodiment of the method is described in an exemplary manner by means of an ultrasonic welding unit provided with a reject part cutter and illustrated in the drawing.

In the following.

DETAILED DESCRIPTION OF THE INVENTION

Figure 1:
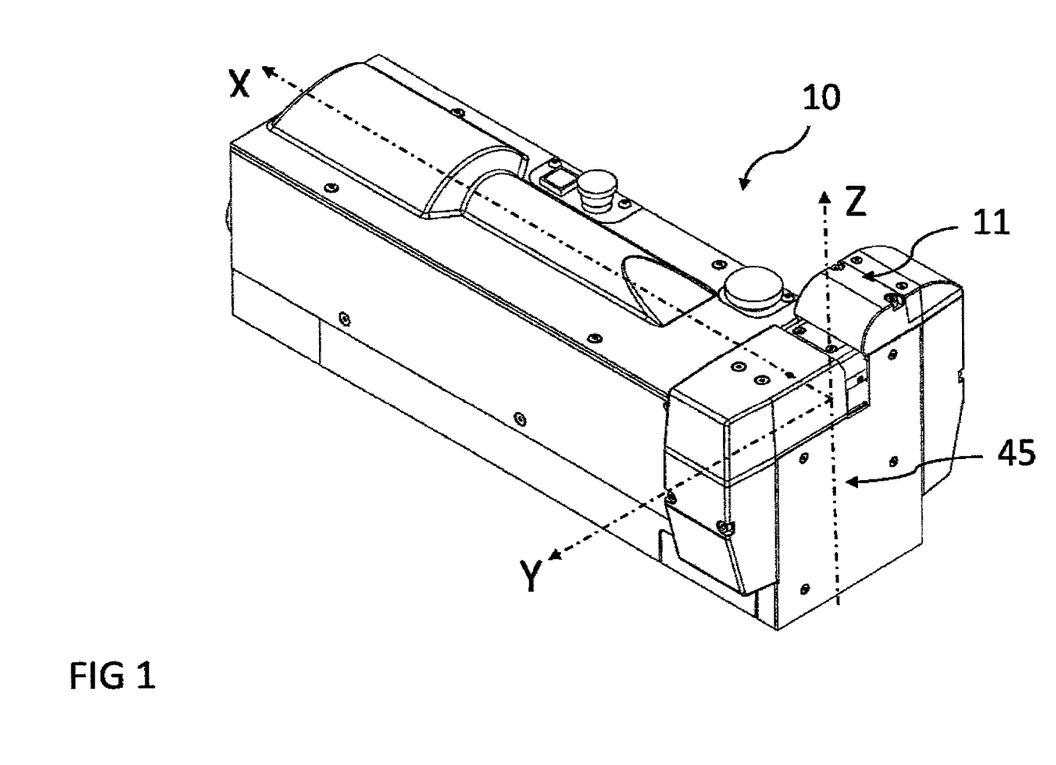
FIG. 1 illustrates an isometric view of the ultrasonic welding unit provided with the reject part cutter.

In an isometric view, FIG. 1 illustrates an ultrasonic welding unit 10 comprising a receiving device, which is illustrated in particular in FIG. 3 and is realized as a compacting space 12, below a covering 11.

Figure 5:
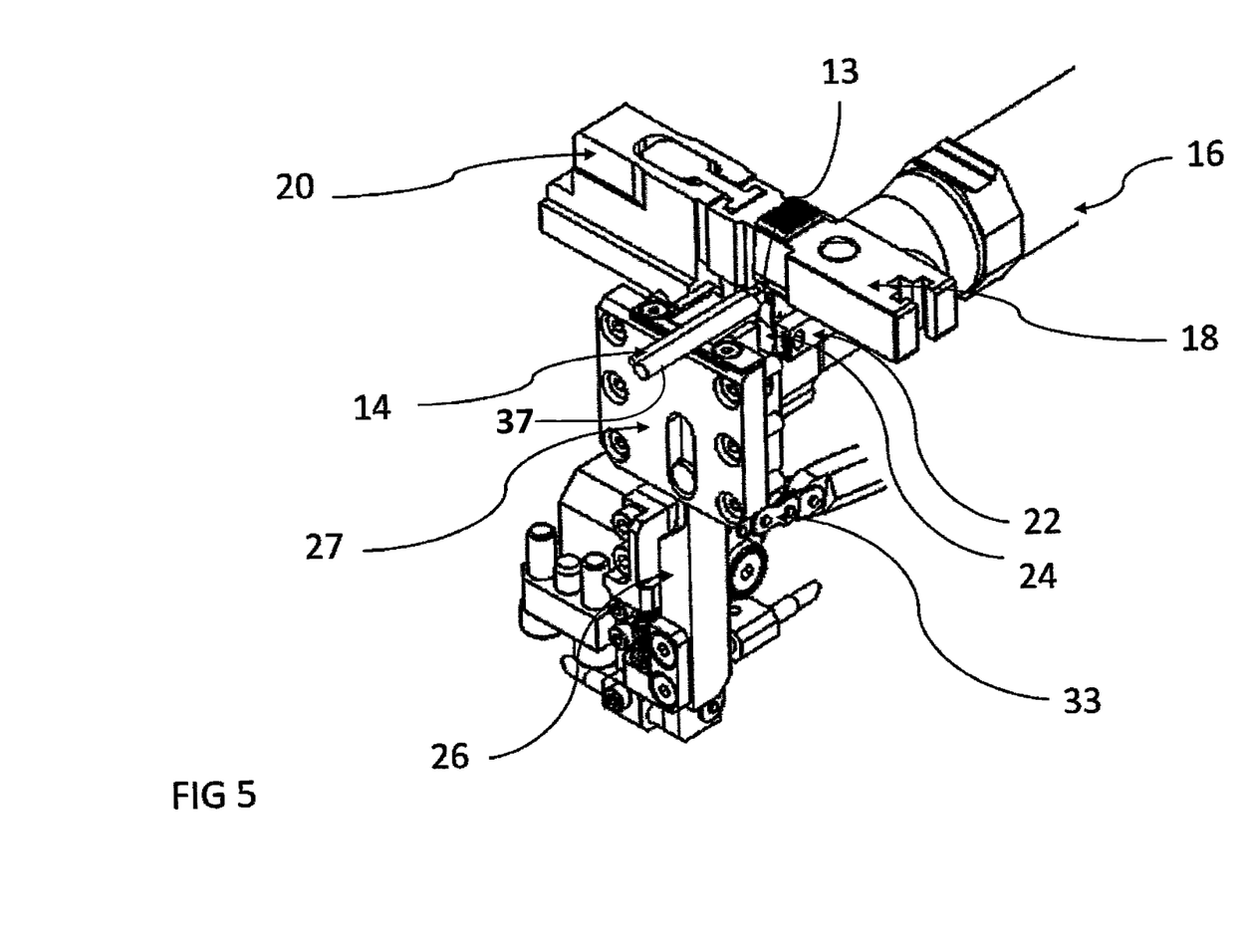
FIG. 5 illustrates the knife unit directly before executing a cutting process.

The compacting space 12 serves for receiving, for example, blank portions 13 of electric conductors 14 illustrated in FIG. 5. In the area of the blank portions 13, the conductors 14 are free of their outer insulation 37. As is illustrated in particular in FIG. 3, the compacting space 12 is delimited on two opposite sides in a direction of a z-axis by a work surface 15 of a sonotrode 16 transferring the ultrasonic oscillations in the direction of the x-axis and by a counter-surface 17 of a counter-electrode 18 commonly referred to as an anvil and displaceable in a direction of a y-axis and is delimited on two opposite sides in the direction of the y-axis by a delimiting surface 19 of a slider element 20 displaceable in the direction of the y-axis and by a delimiting surface 21 of a delimiting element 22 commonly referred to as a touching element.

Figure 3:
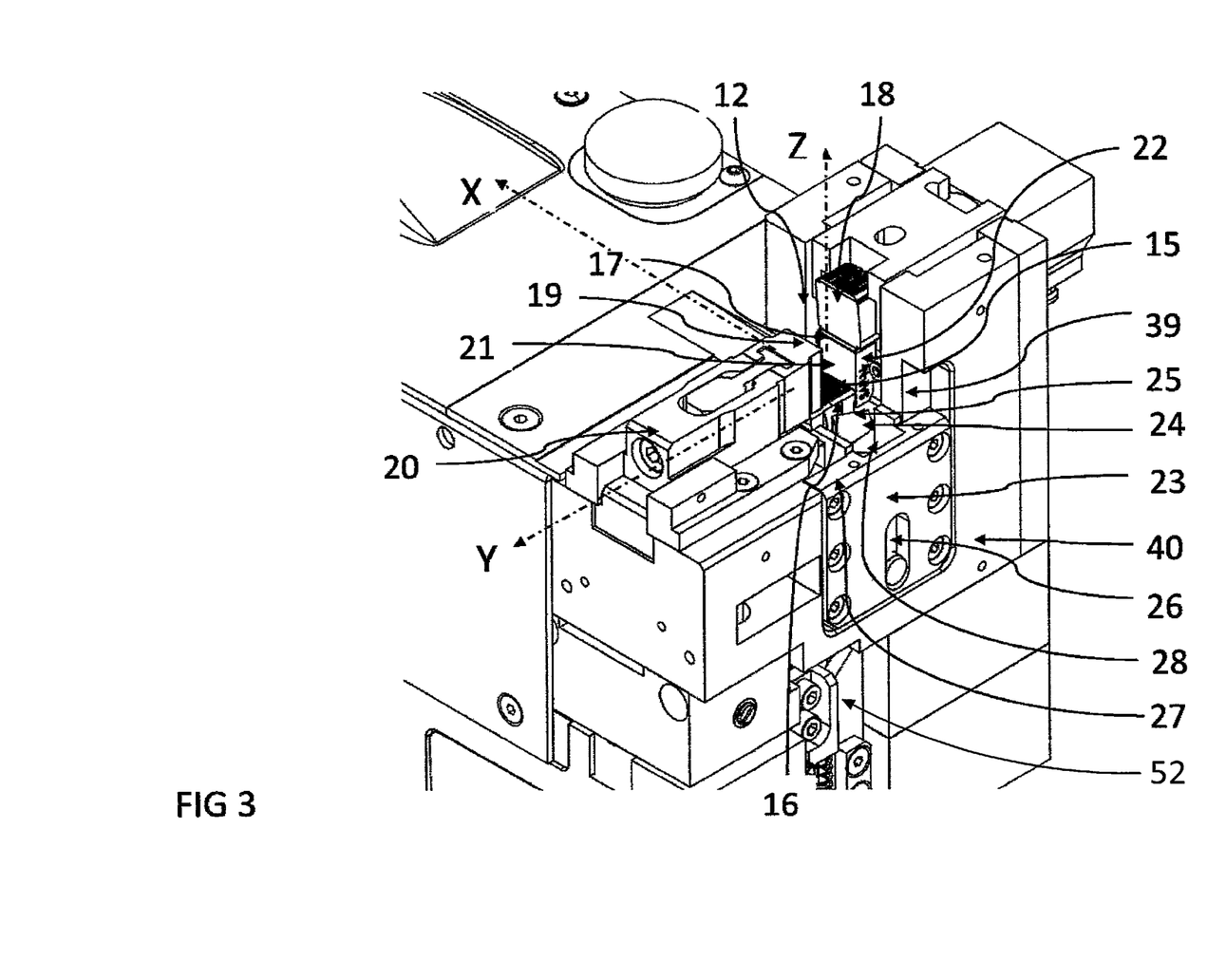
FIG. 3 illustrates a partial sectional view of the unit illustrated in FIG. 1 along with an isometric view of the compacting space.
Figure 4:
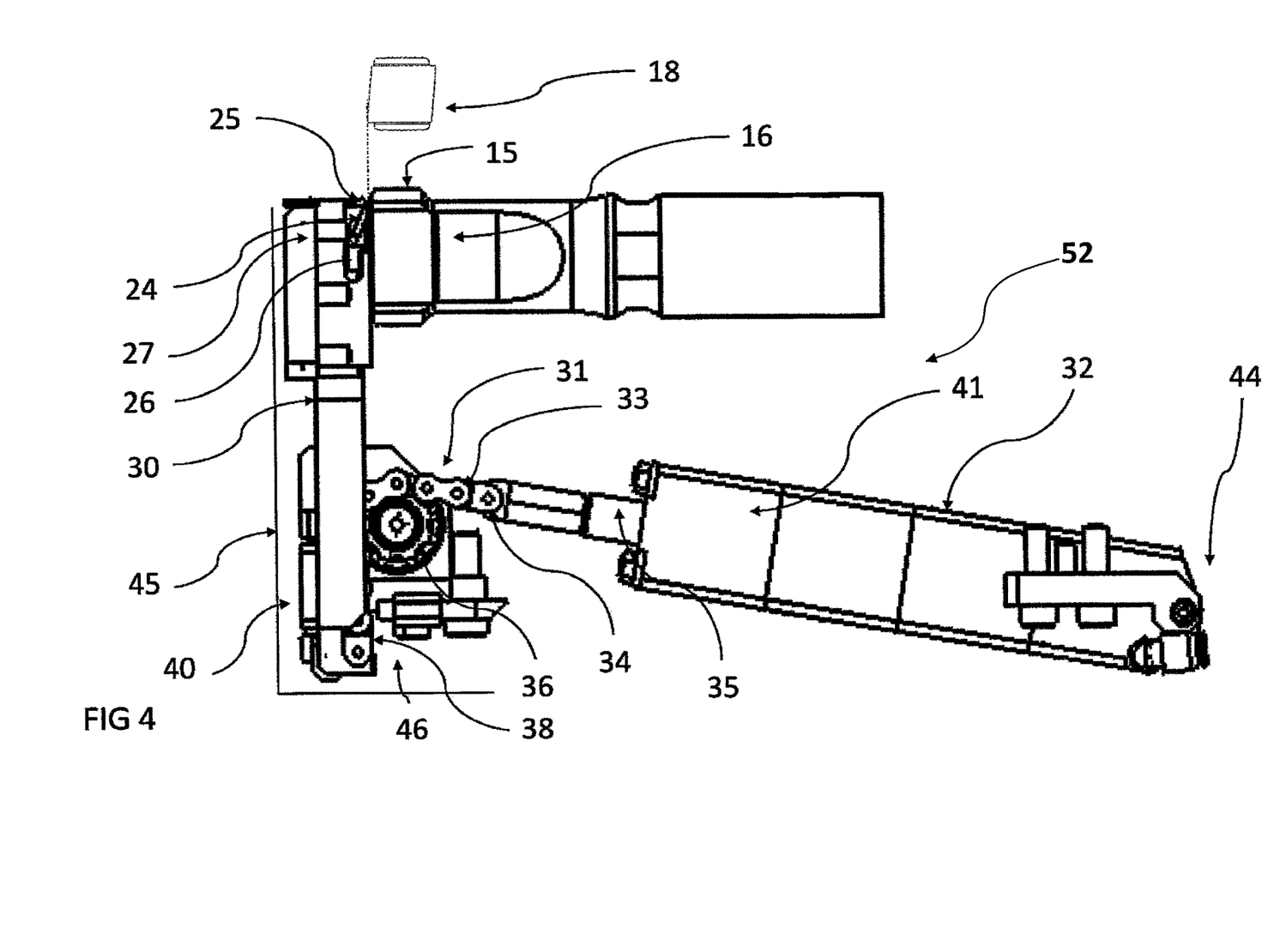
FIG. 4 illustrates a schematic view of the reject part cutter provided with a knife unit.

In the direction of an x-axis, which coincides with the longitudinal axis of the sonotrode 16 in the present instance, a reject part cutter 52 is illustrated having a knife unit 23 and being adjacent to the compacting space 12 and illustrated in its configuration in FIG. 4, said knife unit 23 comprising a knife 24 movable in the direction of the z-axis (FIG. 3). In the instance of the exemplary embodiment at hand, the knife 24 is connected to a knife holder 26 via a screw connection. FIG. 3 illustrates the knife 24 in the lower knife position in which a knife edge 25 is arranged directly below the work surface 15 of the sonotrode 16.

As can be derived in particular from FIG. 3, the knife holder 26 is guided in a guiding device 27, which comprises a guide groove 28 extending in the direction of the z-axis for this purpose.

Figure 2:
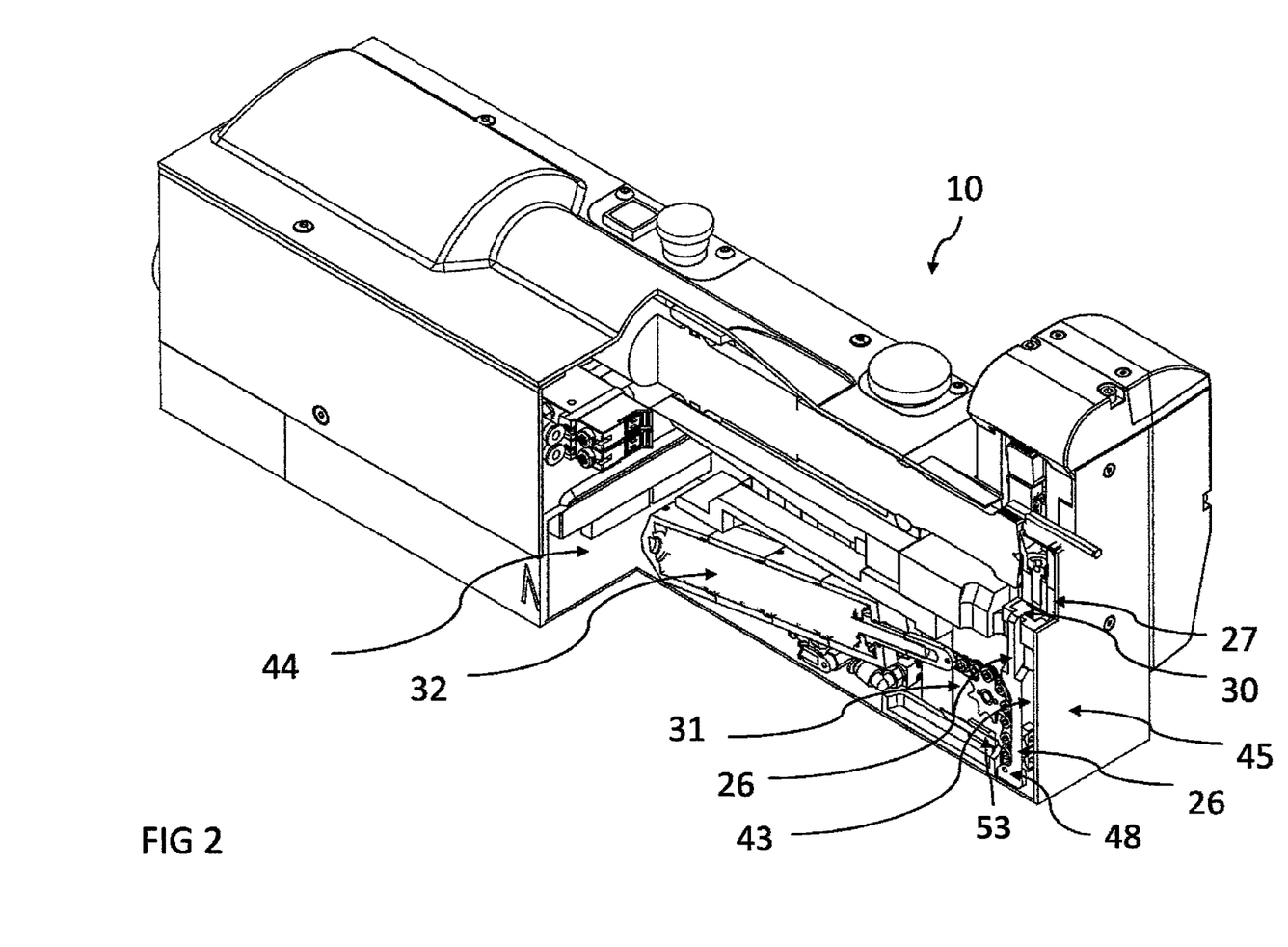
FIG. 2 illustrates a longitudinal sectional view of the unit illustrated in FIG. 1.

As FIGS. 2 and 4 illustrate, the knife holder 26 provided with a lever 30 in the instance of the exemplary embodiment at hand is connected to a drive motor realized as a pneumatic power cylinder 32 in the instance of this exemplary embodiment via a drive gear realized as an angle gear 31.

As can be derived in particular from the schematic view in FIG. 4, the angle gear 31 comprises a traction strand realized as a chain 33 whose drive end 34 is connected to a piston rod 35 of the power cylinder 32. The chain 33 is deviated via a deflection wheel realized as a gear 36 in this instance so that the drive end 34 of the chain 33 extends in the direction of the piston rod 35 and a drive end 38, which is connected to the knife holder 26, extends in the direction of the z-axis.

As can be derived in particular from FIG. 3, the guiding device 27 is realized as an insertion which is inserted in a corresponding recess 39 of a casing part 40 of the ultrasonic welding unit 10.

When the device is in operation, the compacting space 12 is closed after the blank portions 13 of the conductors 14 to be connected to one another have been inserted in the compacting space 12, the counter-electrode 18 being displaced in the direction of the y-axis and the slider element 20 being displaced in the opposite direction of the y-axis so that the compacting space 12 is closed, as shown in FIG. 5, and the blank portions 13 of the conductors 14 abut against each other in a defined manner. Subsequently, the blank portions 13 are subjected to mechanical oscillations of the sonotrode in such a manner that the blank portions 13 are compacted and connected to one another for forming a weld node 47 in a friction welding process.

Figure 6:
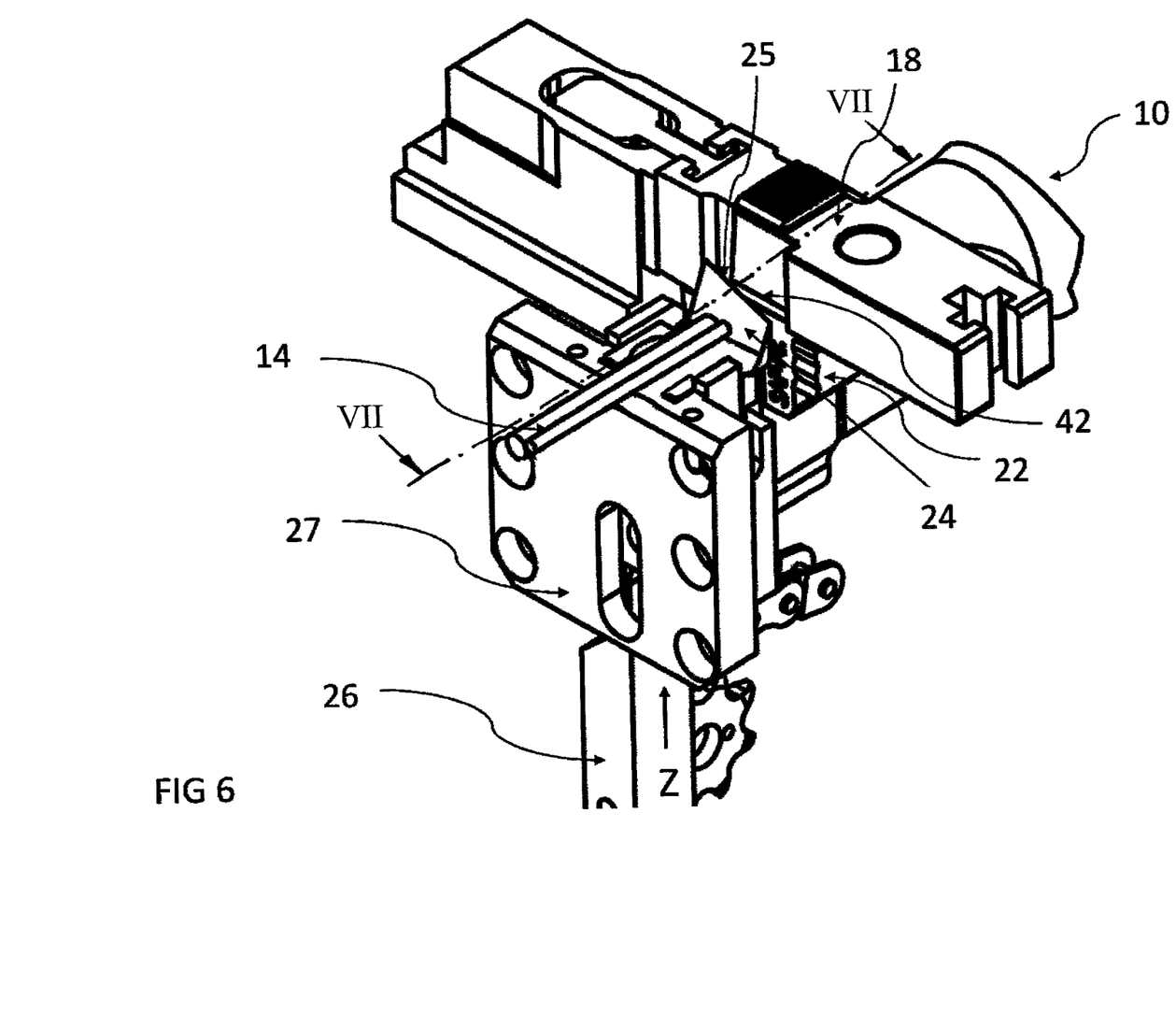
FIG. 6 illustrates the knife unit directly after executing a cutting process.

In the event that a faulty welding parameter or a faulty geometry of the produced weld node 47 is detected and while the compacting space is still closed, the knife unit 23 of the reject part cutter 52 is activated in such a manner that the power cylinder 32, which is made up of four power cylinder elements 41 arranged in a row in the instance of the exemplary embodiment at hand as illustrated in FIG. 4, is pressurized with compressed air so that the knife 24 is moved upward in the direction of the z-axis via the angle gear 31 and, as illustrated in FIG. 6, a part of the blank portions 13, which protrudes over a counter knife edge 42 realized on the counter-electrode 18, is separated from the conductors 14 when the knife edge 25 is moved past the counter knife edge 42 in a cutting movement.

As can be seen in particular in FIG. 2, a spring device 43 is provided for carrying out a return movement 49 of the knife 24 after executing the cutting movement 48, said spring device 43 being arranged between the knife holder 26 and the guiding device 27 and being designed as a compression spring in the instance of the exemplary embodiment at hand. In order to detect an upper and a lower end point of the cutting movement of the knife 24, sensors 53 are provided, albeit only the lower sensor 53 is illustrated in FIG. 2 and is realized as an inductive sensor and interacts with a cam 48 of the knife holder 26.

Figure 7:
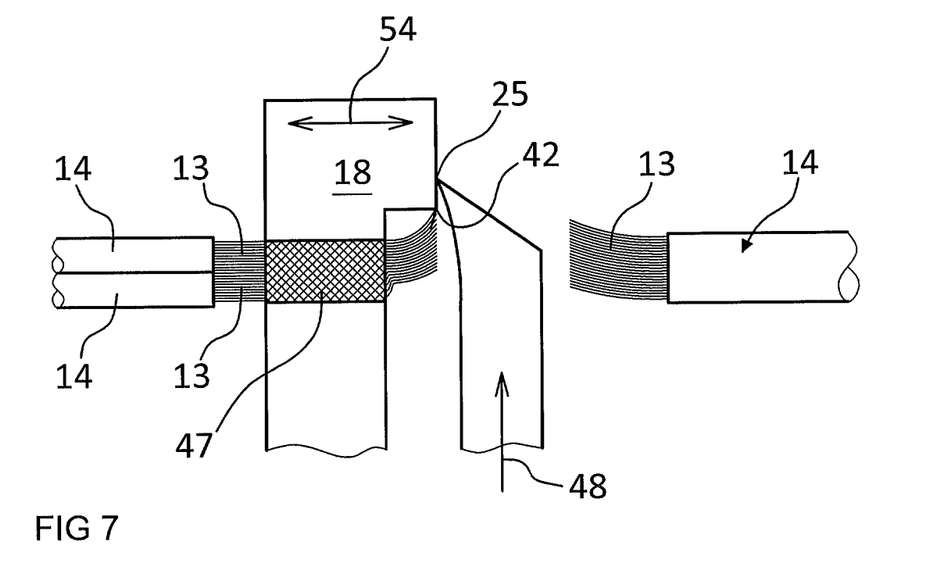
FIG. 7 illustrates a partial sectional view of the knife unit according to the section line VII-VII in FIG. 6 along with a view of a cutting movement of the knife.
Figure 8:
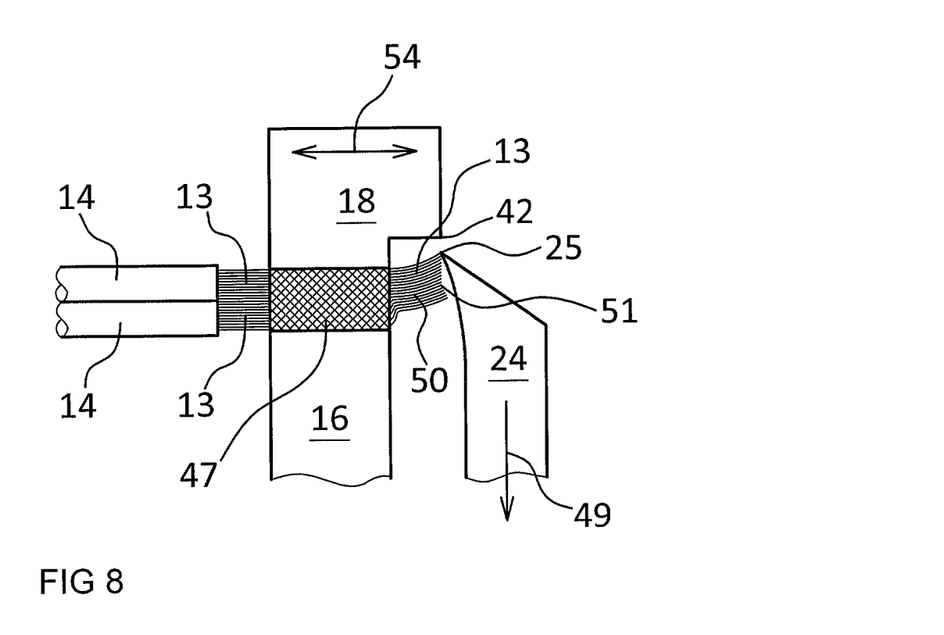
FIG. 8 illustrates a partial sectional view of the knife unit according to the section line VII-VII in FIG. 6 along with a return movement of the knife.

In FIGS. 7 and 8, a cutting process is illustrated in which the blank portion 13 of the right conductor 14 illustrated in FIGS. 7 and 8 is separated from the left conductor 14 for separating the blank portions 13 connected to each other in the weld node 47 after producing the weld node 47 realized as a distributing node between a total of three conductors 14.

During the cutting movement 48 of the knife 24 illustrated in FIG. 7 and during the return movement 49 of the knife 24 illustrated in FIG. 8, the weld node 47 is subjected to mechanical oscillations of the sonotrode 16 so as to be able to carry out the cutting movement 48 as well as the return movement 49 of the knife 24 using a reduced drive force. In this context, the subjection to ultrasound can be carried out permanently while moving the knife 24 or in two chronologically separate phases of subjection to ultrasound so that a first subjection phase is carried out during the cutting movement 48 of the knife 24 and subsequently the subjection to ultrasound is shut off and that the subjection to ultrasound is reactivated during a second subjection phase when carrying out the return movement 49 of the knife.

FIGS. 7 and 8 each illustrate an intersection which is formed adjacent to the weld node 47 and is arranged in the blank portion 13 of the right conductor 14, said intersection comprising a plurality of wires 50 of the conductor 14 severed as a consequence of the previous cutting movement 48. As can be seen, the individual wires 50 are bent open in the direction of the cutting movement 48 as a consequence of the cutting movement 48 and are distanced farther from each other at the intersection as compared to the weld node 47, in which the wires 50 abut against each other in compacted manner, so that the individual wires 50 form a plurality of elastic resistances against the return movement 49 of the knife 24 using their cut ends 51 when the knife edge 25 of the knife 24, as is indicated in FIG. 8, is moved past the cut ends 51.

As a consequence of the subjection of the weld node 47 to ultrasound and the relative back and forth movement 54 of the counter knife edge 42 resulting therefrom during the return movement of the knife 24, the reaction forces acting on the knife 24 via the individual cut ends 51 of the wires 50 are reduced since the individual wires are temporarily relieved by means of the frequency of the subjection to ultrasound.

The result of the effect described above is that, as described above, not only the required drive force for executing the cutting movement 48 of the knife 24 is reduced but also the drive force of the knife 24 required for carrying out the return movement 49 is reduced as a consequence of the subjection of the weld node 47 to ultrasound during the return movement of the knife 24, said drive force of the knife 24 having to be exerted in order to move the knife 24 past the cut ends 51 and back into its initial position for executing another cutting movement.

The invention claimed is:

1. A method for cutting material to be cut, including a rod-shaped element, comprising a receiving device for fixedly receiving the material to be cut in such a manner that a part to be separated from the material to be cut protrudes over an element edge of the receiving device realized as a counter knife edge (42), and comprising a knife unit (23) having a knife (24), which is movable with respect to the receiving device and which moves a knife edge (25) past the counter knife edge (42) in a cutting movement for executing a separating cut, characterized in that a welding material is subjected to ultrasound for executing oscillations during the cutting movement (48) and further characterized in that the rod-shaped element is realized as a fiber bundle or a wire bundle.

2. The method according to claim 1, characterized in that the material to be cut to is subjected to ultrasound indirectly by subjecting the receiving device to ultrasound.

3. The method according to claim 1, characterized in that a subjection to ultrasound occurs transversely to the cutting movement (48).

4. The method according to claim 1, characterized in that the receiving device is realized as a compacting space (12) for receiving blank portions (13) of rod-shaped conductors (14) to be connected to one another to form a weld node (47) comprising a sonotrode (16) for delimiting the compacting space (12) and for subjecting the blank portions (13) to ultrasound, said weld node (47) being subjected to ultrasound by means of the sonotrode (16) following the formation of the weld node (47) while executing the cutting movement (48) of the knife (24).

5. The method according to claim 4, characterized in that a subjection to ultrasound occurs during the cutting movement and a return movement (49) of the knife (24) by means of the sonotrode (16).

6. The method according to claim 2, characterized in that a subjection to ultrasound occurs transversely to the cutting movement (48).

7. The method according to claim 2, characterized in that the rod-shaped element is realized as a fiber bundle or a wire bundle.

8. The method according to claim 3, characterized in that the rod-shaped element is realized as a fiber bundle or a wire bundle.

9. The method according to claim 2, characterized in that the receiving device is realized as a compacting space (12) for receiving blank portions (13) of rod-shaped conductors (14) to be connected to one another to form a weld node (47) comprising a sonotrode (16) for delimiting the compacting space (12) and for subjecting the blank portions (13) to ultrasound, said weld node (47) being subjected to ultrasound by means of the sonotrode (16) following the formation of the weld node (47) while executing the cutting movement (48) of the knife (24).

10. The method according to claim 9, characterized in that a subjection to ultrasound occurs during the cutting movement and a return movement (49) of the knife (24) by means of the sonotrode (16).

11. The method according to claim 3, characterized in that the receiving device is realized as a compacting space (12) for receiving blank portions (13) of rod-shaped conductors (14) to be connected to one another to form a weld node (47) comprising a sonotrode (16) for delimiting the compacting space (12) and for subjecting the blank portions (13) to ultrasound, said weld node (47) being subjected to ultrasound by means of the sonotrode (16) following the formation of the weld node (47) while executing the cutting movement (48) of the knife (24).

12. The method according to claim 11, characterized in that a subjection to ultrasound occurs during the cutting movement and a return movement (49) of the knife (24) by means of the sonotrode (16).

13. The method according to claim 1, characterized in that the receiving device is realized as a compacting space (12) for receiving blank portions (13) of rod-shaped conductors (14) to be connected to one another to form a weld node (47) comprising a sonotrode (16) for delimiting the compacting space (12) and for subjecting the blank portions (13) to ultrasound, said weld node (47) being subjected to ultrasound by means of the sonotrode (16) following the formation of the weld node (47) while executing the cutting movement (48) of the knife (24).

14. The method according to claim 13, characterized in that a subjection to ultrasound occurs during the cutting movement and a return movement (49) of the knife (24) by means of the sonotrode (16).

15. The method according to claim 4, characterized in that the receiving device is realized as a compacting space (12) for receiving blank portions (13) of rod-shaped conductors (14) to be connected to one another to form a weld node (47) comprising a sonotrode (16) for delimiting the compacting space (12) and for subjecting the blank portions (13) to ultrasound, said weld node (47) being subjected to ultrasound by means of the sonotrode (16) following the formation of the weld node (47) while executing the cutting movement (48) of the knife (24).

16. The method according to claim 15, characterized in that a subjection to ultrasound occurs during the cutting movement and a return movement (49) of the knife (24) by means of the sonotrode (16).

* * * * *